Dec. 10, 1929.　　　J. C. JACQUES　　　1,738,775
STAIR TREAD AND HOLDER
Filed Nov. 28, 1927
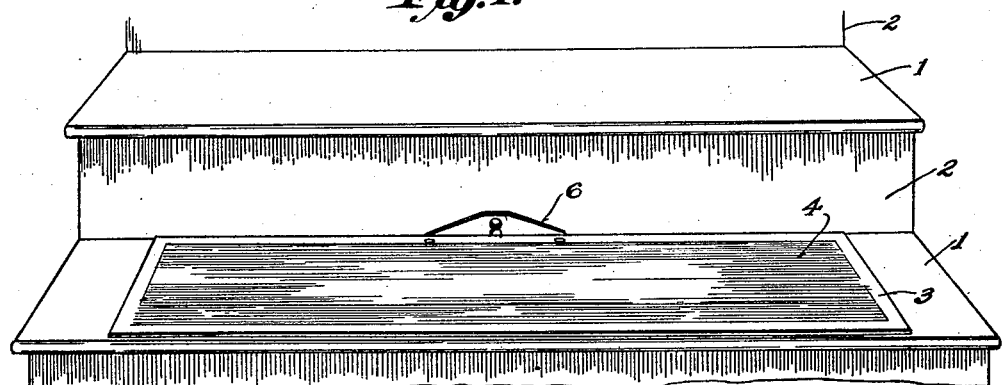
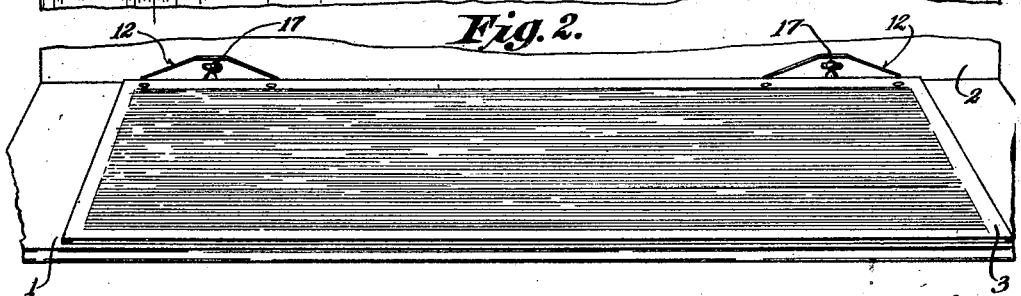
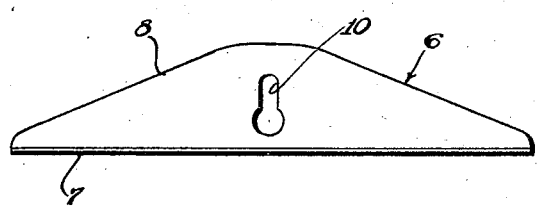
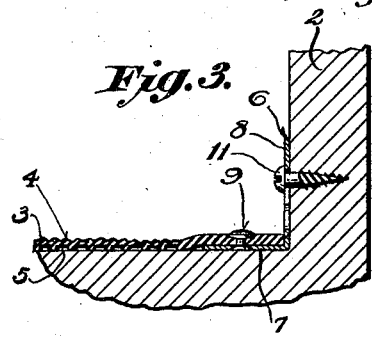
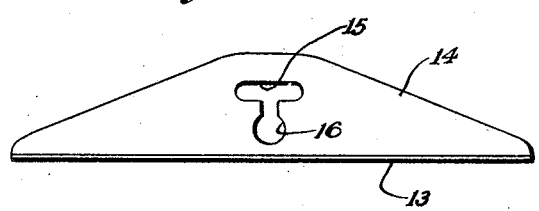
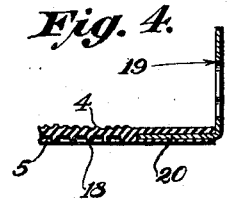
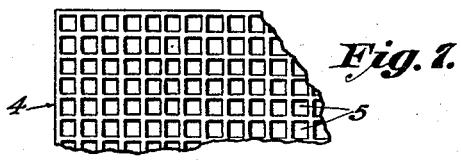

Patented Dec. 10, 1929

1,738,775

UNITED STATES PATENT OFFICE

JOSEPH C. JACQUES, OF BUFFALO, NEW YORK

STAIR TREAD AND HOLDER

Application filed November 28, 1927. Serial No. 236,216.

This invention relates to improvements in stair treads and is designed to provide a tread construction in unit form which may be easily applied to a stair step with suitable means to readily and detachably retain it in position.

The stair tread of this invention is preferably formed of suitable flexible material such as rubber, to provide a separate tread member for each step, having the face engaging the step formed for gripping cooperation with the step so it will be retained in place during use, and which is provided with suitable holders detachably secured to the riser for positioning and holding the tread members in position on each step, and for effectively retaining them in aligned, symmetrical relation on a stairway.

The invention is also designed to provide a flexible sheet material tread member with suitable holders having angular extensions formed with slots to detachably receive the studs applied to the risers of a stairway, and to permit relative adjustment of a limited character so that each tread member may be aligned with the other tread members on the stairway, and in which the studs have interlocking connection with the holders normally preventing detachment of the tread members from the stairs.

The invention includes numerous other features which are more clearly pointed out in the following description and claims directed to the preferred forms of construction, it being understood, however, that various changes in the size, shape and arrangement of parts may be made without departing from the spirit and scope of the invention as herein set forth.

In the drawings forming part of this application,

Fig. 1 is a perspective showing a portion of a stairway having a tread member applied thereto in accordance with this invention.

Fig. 2 is a perspective similar to Fig. 1 showing a similar form of tread member with a slightly different form of holder construction.

Fig. 3 is a vertical, transverse section through a portion of one step and the adjacent riser showing how the holder member secures the tread member to the riser.

Fig. 4 is a transverse, sectional view through a portion of a tread member and associated holder in which the holder is secured to the tread member by embedding it in the material of the tread member.

Fig. 5 is an enlarged, detailed elevation of a holder member constructed as shown in Fig. 1.

Fig. 6 is a view similar to Fig. 5 of one of the holder members as illustrated in Fig. 2.

Fig. 7 is an enlarged, bottom plan view of one corner portion of a tread member showing the manner of forming the bottom surface thereof.

In Figs. 1 and 2, 1 illustrates the steps of a suitable stairway, and 2 the risers.

The tread member of this invention is indicated by the numeral 3 and is preferably in the form of a rubber sheet having the tread surface or upper surface thereof provided with longitudinal corrugations or ribs to form a non-slipping surface generally indicated at 4. The bottom faces of these tread members 3 are preferably formed with a plurality of recesses 5 to provide suction cups or the like in order that the lower face of each tread member will have a gripping cooperation with the steps 1. By this construction these flexible sheets will normally tend to retain their position on the steps against displacement during use.

Holder members 6 are provided as shown in Figs. 1 and 5 which are formed of metal plates having a base portion 7 and a laterally extending flange 8. The base portion 7 is secured under the edge of the tread member 3 by suitable rivets or the like as indicated at 9 in Fig. 3. These tread members may be held in position by one holder member 6 as shown in Fig. 1, if desired, in which case the holder member is placed in the central portion of the rear edge of the tread member. The upwardly extending lateral flange 8 is provided with a keyhole slot 10 having the enlargement at the lower end to receive the holding stud or screw 11. This stud 11 is mounted in the riser 2 above the surface of the step a sufficient distance that it will engage in the upper end of the slot 10 when the holder member and the tread member are placed in the proper operative position on the step. In this position the head will engage the marginal portion of the flange 8 around opening 10 and retain said holder against the riser in the position shown in Fig. 3. The flexibility of the rubber tread member is such that it will normally engage and lie flat on the surface of the step with the rear edge substantially engaging the riser adjacent to the step. In this way, the edge of the tread member engaging the riser will prevent any tendency of the same to slide transversely of the step while the holder member 6 will effectively retain the tread member to prevent the rear edge from moving away from the riser and also prevent longitudinal movement of the tread member on the step.

As an individual uses the steps equipped with this invention as above described, the pressure of the foot engaging the tread member will cause the suction cups 5 to engage and have gripping cooperation with the step so that any twisting of the foot or other movements thereof imparted to the tread member will be prevented from causing a movement of the tread member on the step, and an additional holding action will be exerted on the tread member by the holder 6 with the cooperation of the rear edge of the tread member with the riser. In this way, the holder 6, the cups 5 and the rear edge of the tread member engaging the riser cooperate to effectively prevent movement of the tread member during use thereof on the step.

In order to prevent accidental disengagement of the holders from the studs, and also where substantially long tread members are used for relatively wide steps, it is desirable to employ more than one holder, and in this case a construction similar to that shown in Fig. 2 is preferably used. The holders shown in Figs. 2 and 6 are indicated by the numeral 12 and are substantially similar in form to the holders 6 having the base portions 13 and the upwardly extending lateral flange portions 14. The flange portions 14 are formed with T-shaped slots 15 having the lower end of the stem portion of the slots enlarged as indicated at 16 to receive the heads of studs 17. In the construction shown in Fig. 2 a pair of holders are used which have base flanges 13 riveted or otherwise secured adjacent the ends of tread member 3 along the rear edge thereof. More than two of these holders may be used if desired. The tread members and the holders are mounted on the step and riser in exactly the same manner as the structure shown in Fig. 1, with the additional feature of obtaining an interlocking action between studs 17 and holders 12 to prevent accidental disengagement of the holders from the studs. This is obtained by having the distance between studs 17 less than the distance between the stem or vertical portions of T-slots 15. In this way, it is necessary to engage one of the holders with one of the studs at a time, shifting the tread member laterally a slight distance to permit the engagement of the other holder with its stud. In engaging or disengaging these holders with the studs, it will therefore be seen that the tread member must be moved to permit their independent engagement and disengagement, one at a time, and that in the secured position shown in Fig. 2 studs 17 are out of alignment with the stem or vertical portions of slots 15 so that the holders can not be moved upwardly on the studs to permit the heads to move through enlargement 16 of the slots, which is necessary for either engagement or disengagement of the holders therefrom. Should persons, in using a stairway equipped with the construction shown in Fig. 2, kick the edges of the tread members causing them to buckle which would produce a shifting action or elevate the holders, it will be seen that the interlocking action obtained by the T-slots and the relatively offset studs 17 will prevent any shifting or raising of the holders and effectively retain the tread member in place so that it will immediately seek its normal, flat position on the stair step. The provision of T-slots also permits of a slight shifting of the tread members along the steps which will compensate for any differences in position between the studs on several risers so that all of the tread members may be arranged in symmetrical relation.

It is to be understood that the holders 12 may be formed in novel designs and shapes other than those illustrated in the drawing in order to provide a decorative effect on the stairway, if desired, and to enhance the appearance of the invention when applied to a stairway in addition to the special features above set forth.

The holders may also be formed at the time of forming the flexible tread members 3 by embedding the base portion in the tread member as shown in Fig. 4. In this figure the tread member is indicated at 18 while the holder member is illustrated at 19, having the base portion 20 molded into the body of the tread member. Any other method of securing the holders to the tread members which is desirable may be used within the scope of this invention.

From the above description it is to be understood that the special construction of the tread member of flexible sheet rubber or the like, to provide special gripping action between the bottom face and the step, together with the provision of the holders engaged with the studs on the riser, produces a novel combination in which the several features cooperate in effectively retaining the tread member in its proper operative position on a stairway under all conditions of use.

What is claimed is:

1. A stair tread assembly comprising a step having a tread and a riser, a tread sheet of rubber material disposed on the tread, said sheet being unconfined along its edges, a metallic fastener along the edge of the sheet adjacent the riser and secured to the sheet, a unitary flange on the fastener extending at right angles to the sheet and abutting the riser, said flange being formed with an elongated slot having a circular screw head receiving portion, and a screw passing through the slot at a point remote from the circular portion thereof and entering said riser.

2. The combination with a stair step of a rubber tread and securing means therefor, said tread comprising a sheet of rubber having a friction surface on its upper face and a suction surface on its lower face adapted to grip the stair, and fastening means secured to and engaging one edge portion of the sheet and said stair, said fastening means comprising a metallic plate formed with an elongated slot having an enlarged circular screw head receiving portion merging into a narrow screw head engaging portion, and a screw passing through the slot at a point remote from the circular portion thereof and entering said stair.

JOSEPH C. JACQUES.